(12) United States Patent  
Apitz

(10) Patent No.: US 8,466,955 B2  
(45) Date of Patent: Jun. 18, 2013

(54) SYSTEM, METHOD AND APPARATUS FOR WIRELESS SYNCHRONIZING THREE-DIMENSIONAL EYEWEAR

(75) Inventor: Marcus P. Apitz, Yorba Linda, CA (US)

(73) Assignee: Vizio, Inc., Irvine, CA (US)

( * ) Notice: Subject to any disclaimer, the term of this patent is extended or adjusted under 35 U.S.C. 154(b) by 577 days.

(21) Appl. No.: 12/703,213

(22) Filed: Feb. 10, 2010

(65) Prior Publication Data

US 2011/0193946 A1    Aug. 11, 2011

(51) Int. Cl.  
*H04N 13/04*     (2006.01)  
*H04N 9/47*      (2006.01)

(52) U.S. Cl.  
USPC ............... 348/56; 348/42; 348/53; 348/154; 382/154

(58) Field of Classification Search  
USPC ........... 348/42, 53, 56–60, 500, 513; 382/154  
See application file for complete search history.

(56) References Cited

U.S. PATENT DOCUMENTS

| | | | |
|---|---|---|---|
| 6,760,772 B2 * | 7/2004 | Zou et al. | 709/230 |
| 6,996,064 B2 * | 2/2006 | Klassen et al. | 370/238 |
| 7,088,398 B1 * | 8/2006 | Wolf et al. | 348/423.1 |
| 8,018,483 B2 * | 9/2011 | Nakanishi | 348/53 |
| 2001/0043266 A1 * | 11/2001 | Robinson et al. | 348/53 |
| 2010/0194857 A1 * | 8/2010 | Mentz et al. | 348/43 |

* cited by examiner

*Primary Examiner* — Sath V Perungavoor  
*Assistant Examiner* — Nathnael Aynalem  
(74) *Attorney, Agent, or Firm* — Law Office of Scott C. Harris, Inc.

(57) ABSTRACT

An application for transmission of a three-dimensional eyewear synchronization signal to synchronize the operation of shutters of three-dimensional eyewear uses an industry standard wireless transmission technique. To compensate for inherent latencies of such transmission techniques, the latencies are measured and monitored to determine expected latencies and the shutter synchronization signal is skewed by the latency. In some embodiments, the synchronization signal is further adjusted by a user skew control.

20 Claims, 6 Drawing Sheets

SYSTEM, METHOD AND APPARATUS FOR WIRELESS SYNCHRONIZING THREE-DIMENSIONAL EYEWEAR

CROSS-REFERENCE TO RELATED APPLICATION

This application is related to U.S. patent application titled "PIXEL SYSTEM, METHOD AND APPARATUS FOR SYNCHRONIZING THREE-DIMENSIONAL EYEWEAR," filed Feb. 1, 2010, application Ser. No. 12/697,310. This application is also related to U.S. patent application titled "FRAME SYSTEM, METHOD AND APPARATUS FOR SYNCHRONIZING THREE-DIMENSIONAL EYEWEAR," filed Feb. 1, 2010, application Ser. No. 12/697,312. This application is also related to U.S. patent application titled "PIXEL BASED THREE-DIMENSIONAL ENCODING METHOD," filed Feb. 1, 2010, application Ser. No. 12/697,313. This application is also related to U.S. patent application titled "FRAME BASED THREE-DIMENSIONAL ENCODING METHOD," filed Feb. 1, 2010, application Ser. No. 12/697,315.

FIELD

This invention relates to the field of display devices worn over an individual's eyes and more particularly to a system for synchronizing the display devices with content presented on a display screen.

BACKGROUND

There are several ways to present a three-dimensional image to a viewer of a television. The common aspect of the existing methods is to present an image or frame from two perspectives, a left-eye perspective of the content to the left eye and present an image or frame from a right-eye perspective to the right eye. This creates the proper parallax so that the viewer sees both perspectives and interprets what they are seeing as three-dimensional.

Early three-dimensional content was captured using two separate cameras aimed at the subject but slightly separate from each other providing two different perspectives. This simulates what the left eye and right eye see. The cameras simultaneously exposed two films. Using three-dimensional eyewear, the viewer looks through one film with the left eye and the other film with the right eye, thereby seeing what looks like a three-dimensional image.

Progressing to motion pictures, three-dimensional movies were produced in a similar way with two cameras, but the resulting images were color encoded into the final film. To watch the film in three-dimension, eyewear with colored filters in either eye separate the appropriate images by canceling out the filter color. This process is capable of presenting a three-dimensional movie simultaneously to a large audience, but has marginal quality and, because several colors are filtered from the content, results in poor color quality, similar to a black and white movie.

More recently, personal eyewear have been made that have two separate miniature displays, one for each eye. In such, left content is presented on the display viewed by the left eye and right content is presented on the display viewed by the right eye. Such systems work well, but require a complete display system for each viewer.

Similar to this, Eclipse methods uses a common display, such as a television, along with personal eyewear that have fast-response shutters over each eye. In such, the left eye shutter is open allowing light to pass, the right eye shutter is closed blocking light and the television displays left-eye content, therefore permitting the light (image) from the television to reach the left eye. This is alternated with closing of the left eye shutter, opening of the right eye shutter and displaying right-eye content the television. By alternating faster than the typical human response time, the display appears continuous and flicker-free.

One problem with the latter two methods is that the three-dimensional content must be encoded on, for example, a disk and decoded by a player that switches between left/right eye content in synchronization with the left-eye and right-eye shutter. With such, one cannot connect an industry standard player (e.g. BlueRay or DVD) to an industry standard television (e.g., Plasma or LCD television) and watch three-dimensional content with a set of three-dimensional eyewear. Another problem is in synchronizing the eyewear with the images displayed on the television. Currently, the three-dimensional eyewear needs to be connected to the television by a low-latency connection, usually a wired connection to assure the proper eyewear shutter is open when the corresponding image is displayed (the image that relates to the eye associated with the open shutter). Although wireless transmission techniques such as WiFi and Bluetooth are well-known, low-cost and readily available, latency is of concern for transmitting a synchronization signal. For example, if at t0, the television displays a left-eye frame and at the same time transmits a Bluetooth packet to eyewear, the eyewear doesn't know the packet has arrived until t0+l, where l is the latency of the transmission. The latency, in an ideal transmission, is equal to the packet size divided by the transmission speed. For high-speed transmission such as 54 Mbs 802.11, the latency is normally rather low, but the latency is often increased due to other wireless devices utilizing the same bandwidth, transmission errors, noise and interference (e.g. interference from a microwave oven, etc). Therefore, the latency ranges from microseconds to many milliseconds. In such a transmission system, when synchronization is skewed due to unpredictable latency, the wrong eye shutter is open for too long, allowing each eye to partially see content/frames designated for the other eye; causing blurring or other artifacts that detract from the three-dimensional viewing experience.

What is needed is a three-dimensional presentation system that utilizes existing packet wireless transmission techniques.

SUMMARY

In order to synchronize the operation of shutters of three-dimensional eyewear, an industry standard wireless transmission technique is utilized. To compensate for inherent latencies of such techniques, the latencies are measured and monitored to determine expected latencies and the shutter synchronization signal is skewed by the measured latency. In some embodiments, the synchronization signal is further adjusted by a user skew control.

The eyewear includes shutters over each eye that open and close fast enough to keep up with the frame rate of the television. A wireless signal is periodically sent from the television or other base-located device to the eyewear. The eyewear receives the wireless signal and determines a latency between the start of the transmission and the actual start and/or end of reception and subtracts the latency from each successive reception of the wireless signal to operate the shutters in synchronization with the television/base-located device. Examples of the wireless transmission technique include, but are not limited to, WiFi (802.11x) and Bluetooth.

A content delivery mechanism (e.g. Internet, cable, fiberoptic, DVD, BlueRay) delivers the content to a television. A circuit associated with the television or external to the television determines when either a left-eye frame or a right-eye frame is being displayed and transmits a minimal amount of information to the eyewear by a wireless transmission (e.g. WiFi or Bluetooth). The wireless packet is received by the three-dimensional eyewear where it is used to properly shutter the first eye and the second eye. A latency value is subtracted from (or added to) the time of reception, resulting in a synchronization point (e.g., a point in time when the left-eye content frame is displayed and left eye shutter should be open). After reception of a sequence of packets, the eyewear determines the expected timing of multiple synchronization points, thereby generating an internal synchronization signal that is closely synchronized with the changing of frames displayed on the television, left content frame to right content frame and right content frame to left content frame. In some systems, a phased-locked loop is used to continue operation of the shutters during periods when the latency is significantly longer than expected; the transmission of the synchronization signal is blocked; or otherwise the transmission of the synchronization signal interrupted. In some systems, the skew is adjustable up or down to provide a fine adjustment of the synchronization should the latency calculation be less than optimal.

In one embodiment, a three-dimensional eyewear synchronization system is disclosed. The three-dimensional eyewear synchronization system has a transmitter that sends a synchronization packet indicating synchronization timing between left-eye content and right-eye content being displayed. The three-dimensional eyewear has a receiver and a shutter system for alternating image viewing to each eye of a wearer. The three-dimensional eyewear receives the synchronization packet, determines the transmission latency and uses a time of receipt of the synchronization packet and the latency to generate an eyewear internal synchronization timing that approximates the synchronization timing. The three-dimensional eyewear controls the shutter system responsive to the eyewear internal synchronization timing.

In another embodiment, a method of synchronizing three-dimensional eyewear to a display of content is disclosed including, at a synchronization point, sending a synchronization packet to the three-dimensional eyewear then determining a latency of the sending and generating an internal synchronization timing in the eyewear by combining a time of reception of the synchronization packet with the latency to control eye shutters of the three-dimensional eyewear in synchronization with the internal synchronization timing.

In another embodiment, a three-dimensional eyewear synchronization system is disclosed including a television that has a display and the display presenting left-eye frames and right-eye frames. A device associated with the television is for transmitting a synchronization packet is synchronized to which of the left-eye frame and the right-eye frame is being displayed on the display. Another device associated with three-dimensional eyewear is for receiving the synchronization packet. There is another device for determining a latency of the transmitting of the synchronization packet and another device for synchronizing shutters of the three-dimensional eyewear using a time of reception of the synchronization packet and the latency to approximate the timing of the display of the left-eye frames and the right-eye frames.

In another embodiment, a three-dimensional eyewear synchronization system is disclosed including a television, the television having a display, the display presenting left-eye frames and right-eye frames and a synchronization signal representing a change between displaying of the left-eye frame and displaying of the right-eye frame on the display. The television includes a device for determining a latency of a transmission of a synchronization packet and a device for transmitting a synchronization packet synchronized to the synchronization signal but retarded in time by the latency (e.g. sent before the synchronization signal). The three-dimensional eyewear have a device for receiving the synchronization packet and have a device for synchronizing shutters to the reception of the synchronization packet, thereby synchronizing approximately with the timing of the display of the left-eye frames and the right-eye frames.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
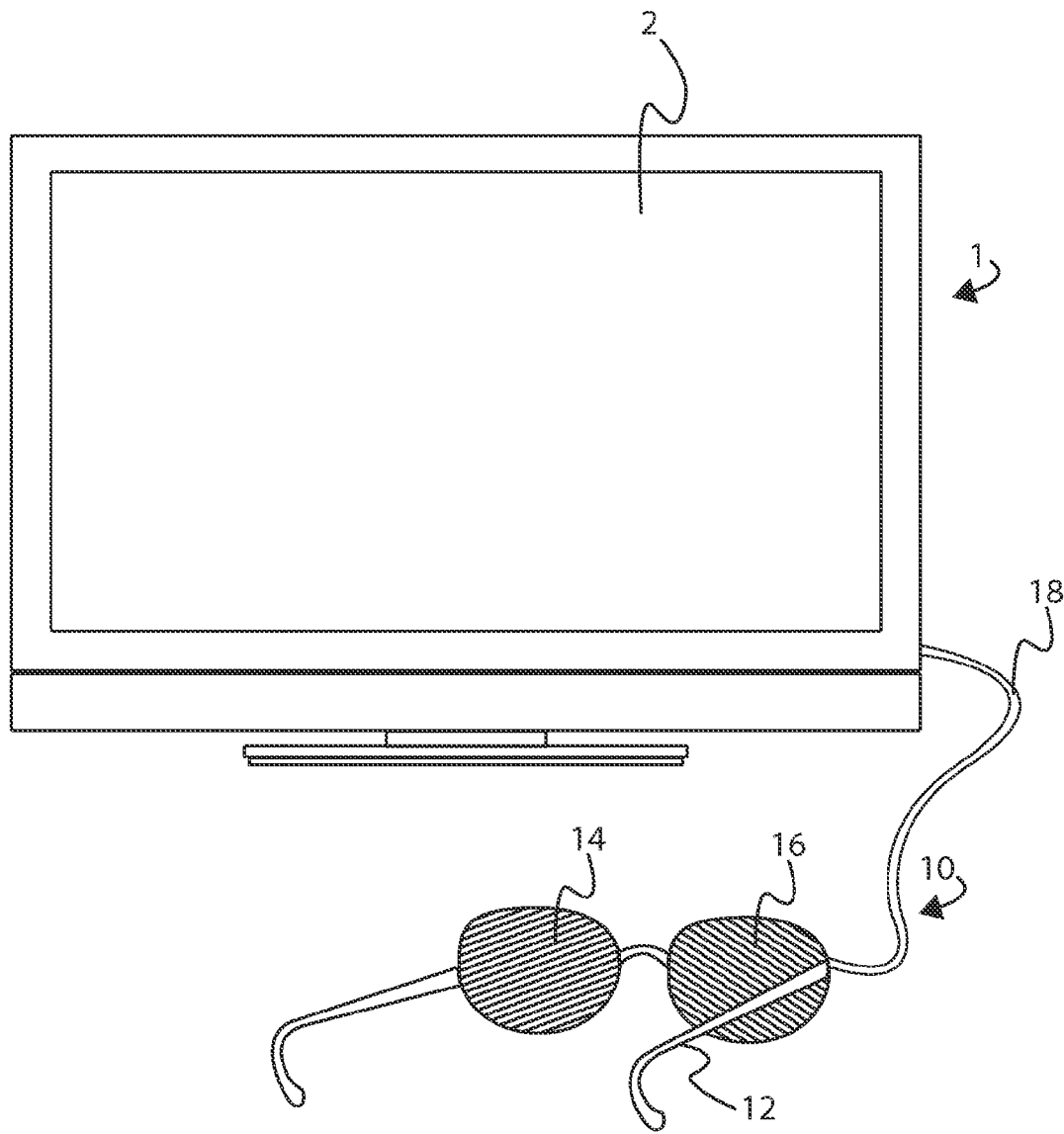
FIG. 1 illustrates a plan view of a television and three-dimensional eyewear of the prior art.

Reference will now be made in detail to the presently preferred embodiments of the invention, examples of which are illustrated in the accompanying drawings. Throughout the following detailed description, the same reference numerals refer to the same elements in all figures. Throughout the description, the term transmitter and receiver are either independent transmitters or receivers and/or are the transmitter section/receiver section of a transceiver.

Referring to FIG. 1, a plan view of a television 1 and three-dimensional eyewear 10 of the prior art is described. In prior technology, three-dimensional eyewear 10 functioned with content delivery hardware, such a personal computer or specially equipped television 1. The personal computer or television 1 displays three-dimensional content on a display 2 and controls the eyewear 10 through a cable 18 that provided control of each eye shutter 14/16, synchronizing the eye shutters 14/16 to the content being displayed on the display 2. The eyewear often includes frames with ear rests 12. In such systems, content contains left-eye and right-eye encoded frames. Specialized hardware and/or software in the personal computer or television 1 displays the content and synchronizes operation of the left/right shutter 14/16 with the display of the content using synchronization signals sent over the cable 18.

The cable interface 18 was needed to assure proper timing of the left shutter 14 and right shutter 16 when left frames and right frames are displayed on the display 2. The cables of the prior art create a comfort, distance and safety issue and are not desired.

Figure 2:
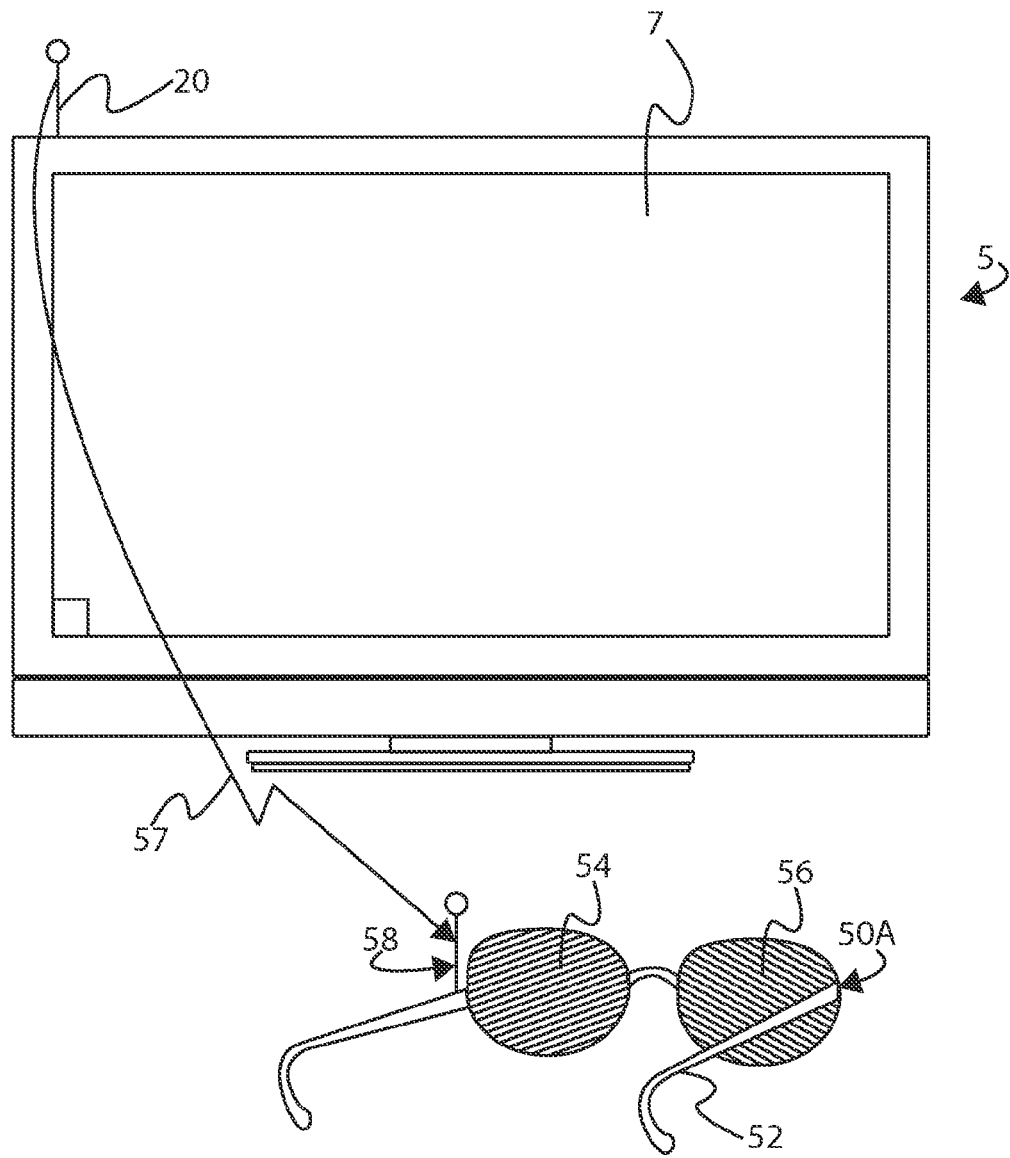
FIG. 2 illustrates a plan view of a television and three-dimensional eyewear.

Referring to FIG. 2, a plan view of a display device (e.g. television) 5 and three-dimensional eyewear 50A is described. In this, a transmitter device has an antenna 20 integrated in the television 5. As will be described, the transmitter periodically transmits a synchronization packet 57 to the three-dimensional eyewear 50A over a wireless transmission channel, for example, using WiFi or Bluetooth. In one example, the synchronization packet 57 is transmitted each time a left-eye content frame is displayed on the display 7. The synchronization packet 57 is received by an antenna 58 and decoded within the eyewear 50A or by an attached circuit to the eyewear 50A (not shown), to control the eyewear shutters 54/56 as will be described. Note, in some embodiments, the eyewear 50A includes ear rests 52 for support.

Figure 3:
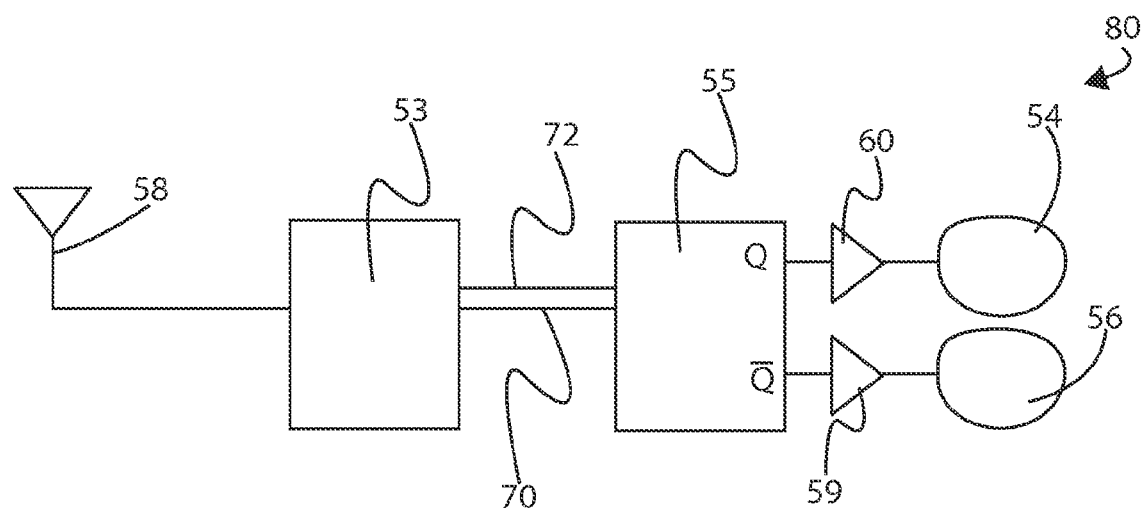
FIG. 3 illustrates a schematic diagram of a typical receiver circuit of the three-dimensional eyewear.

Referring to FIG. 3, a schematic diagram of a typical receiver circuit 80 of the three-dimensional eyewear 50A is described. In such, the radio frequency signal (packet) 57 is received on the antenna 58 and detected/demodulated by a transceiver 53. The transceiver 53 is any known transceiver such as a Bluetooth transceiver or WiFi transceiver. In most packet-based transmission techniques, the entire packet is received and error checked/corrected, then an acknowledgement is transmitted back to the sender (e.g. television 5). The transceiver 53 emits a synchronization signal 70 when it receives a timing packet 57. The synchronization signal 70 is connected to a timing circuit 55. It is anticipated that in some embodiments, the same transceiver 53 also receives other packets for use within the eyewear 50A for other purposes such as audio packets, etc.

The transceiver 53 determines or receives a latency time, l, and relates the latency time, l, to the timing circuit 55 by a latency interface 72 which is any interface as known in the industry such as a voltage, current, digital value (e.g. $I^2C$), etc. In some embodiments, the latency time, l, is determined by the transceiver 53 based on the packet 57 size and the current transmission rate. The transceiver knows the transmission rate, which often varies up and down based upon collisions, interference, competing wireless networks, etc. In other embodiments, the latency, l, is determined at the television 5 (or other base-device) by measuring the time from start of transmission of the packet 57 until start or end of reception of the acknowledgement, then allocating part or all of the time to the latency l. For example, if the transmission packet length is 128 bits and the acknowledgement packet length is 64 bits, and the time measured is 12 microseconds, then ⅔ of the time or 8 microseconds is allocated to the latency l. In such, the latency value is then transmitted as part of the next packet 57, received by the transceiver 53 and provided to the timing circuit 55 over the latency interface 72 for determining synchronization of the shutters 54/56.

The timing circuit locks onto the synchronization signal 70 and adds or subtracts the latency value to generate a left-eye (Q) control signal and a right-eye (−Q) that are coupled to the left-eye shutter 54 and right-eye shutter 56, respectively, by shutter drivers 60/59. In the preferred embodiment, the timing circuit 55 includes a phased-locked-loop that provides the left-eye and right-eye control signals during a loss of the synchronization signal 70, for example when interference temporarily disables transmission of the packets 57. In some embodiments, the phase-locked-loop also performs a filter function, ignoring spurious extreme latency values that occur, for instance, when the wireless interface is used to transfer data, etc.

Figure 4:
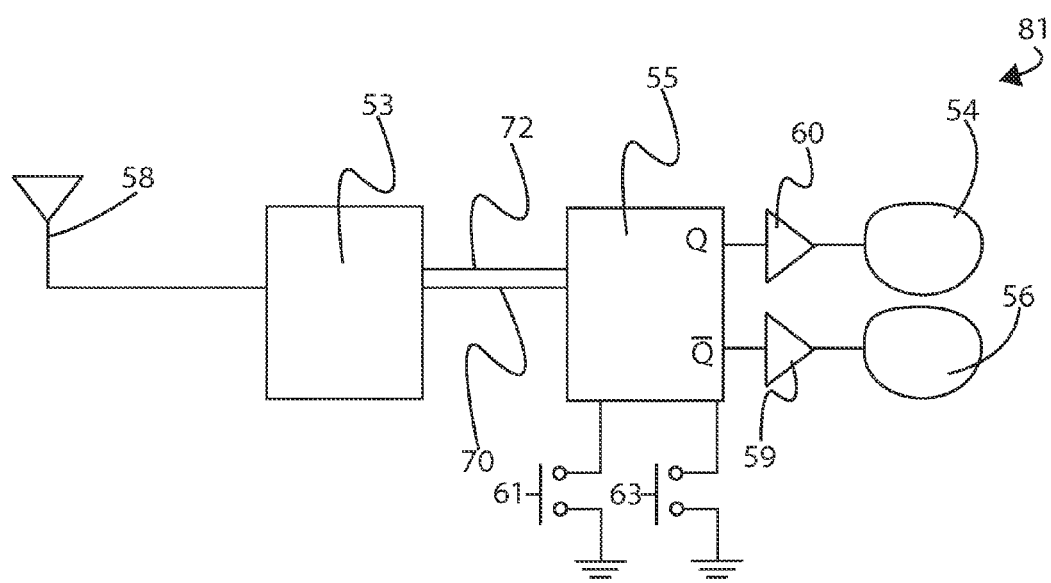
FIG. 4 illustrates a schematic diagram of a typical receiver circuit of the three-dimensional eyewear with adjustable skew.

Referring to FIG. 4, a schematic diagram of a typical receiver circuit 81 of the three-dimensional eyewear 50A with adjustable skew is described. In such, the radio frequency signal (packet) 57 is received on the antenna 58 and detected/demodulated by a transceiver 53. The transceiver 53 is any known transceiver such as a Bluetooth transceiver, WiFi transceiver or infrared transceiver. In most packet-based transmission techniques, the entire packet is received and error checked/corrected, then an acknowledgement is transmitted back to the sender (e.g. television 5). The transceiver 53 emits a synchronization signal 70 when it receives a timing packet 57. The synchronization signal 70 is connected to a timing circuit 55. It is anticipated that in some embodiments, the same transceiver 53 also receives other packets for use within the eyewear 50A for other purposes such as audio packets, etc.

The transceiver 53 determines or receives a latency time, l, and relates the latency time, l, to the timing circuit 55 by a latency interface 72 which is any interface as known in the industry such as a voltage, current, digital value (e.g. $I^2C$), etc. In some embodiments, the latency time, l, is determined by the transceiver 53 based on the packet 57 size and the current transmission rate. The transceiver knows the transmission rate, which often varies up and down based upon collisions, interference, competing wireless networks, etc. In other embodiments, the latency, l, is determined at the television 5 (or other base-device) by measuring the time from start of transmission of the packet 57 until start or end of reception of the acknowledgement, then allocating part or all of the time to the latency l. For example, if the transmission packet length is 128 bits and the acknowledgement packet length is 64 bits, and the time measured is 12 microseconds, then ⅔ of the time or 8 microseconds is allocated to the latency l. In such, the latency value is then transmitted as part of the next packet 57, received by the transceiver 53 and provided to the timing circuit 55 over the latency interface 72 for determining synchronization of the shutters 54/56.

The timing circuit locks onto the synchronization signal 70 and adds or subtracts the latency value l to generate a left-eye (Q) control signal and a right-eye (−Q) that are coupled to the left-eye shutter 54 and right-eye shutter 56, respectively, by shutter drivers 60/59. In the preferred embodiment, the timing circuit 55 includes a phased-locked-loop that provides the left-eye and right-eye control signals during a loss of the synchronization signal 70, for example when interference temporarily disables transmission of the packets 57. In some embodiments, the phase-locked-loop also performs a filter function, ignoring spurious extreme latency values that occur, for instance, when the wireless interface is used to transfer data, etc.

In this example, since the latency value is a prediction and has inherent, minor inaccuracies due to interference, distances, reflections, etc, a skew control is provided. Any known skew control device is anticipated such as up/down buttons 61/63 (as shown), thumb wheels, rotary controls such as potentiometers, etc. In the example shown, the skew control includes an up-skew 61 and a down-skew 63 which moves the synchronization timing forward or backward, respectively. In such, the user adjusts the skew for maximum viewing enjoyment.

Figure 5:
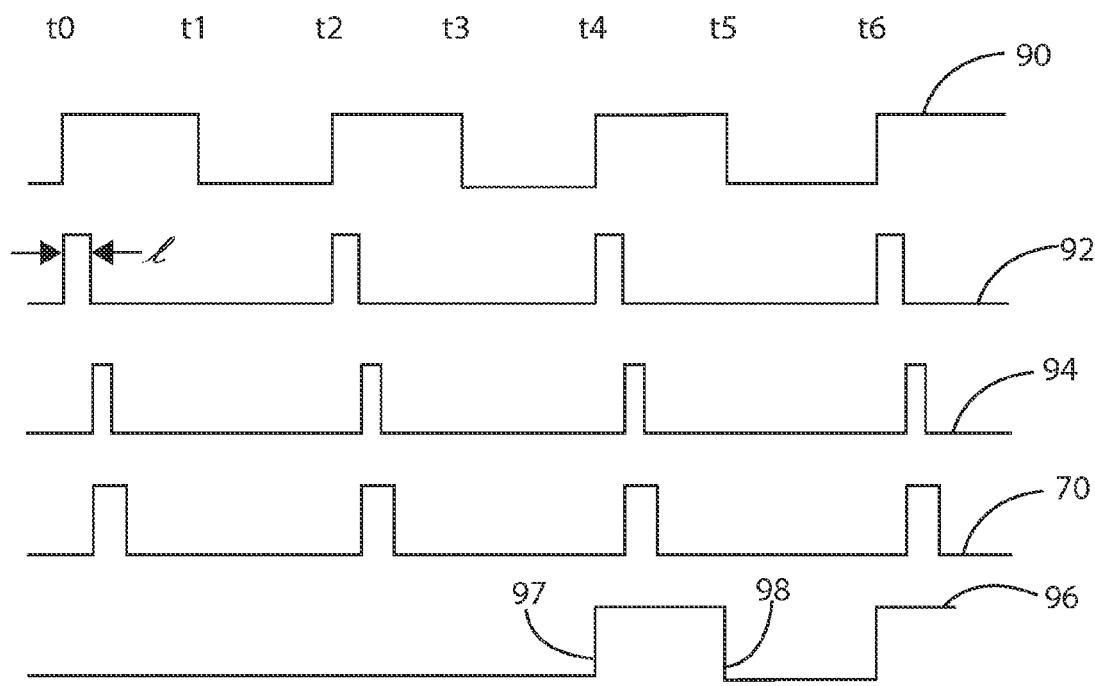
FIG. 5 illustrates a synchronization timing chart.

Referring to FIG. 5, an exemplary synchronization timing chart is described. In this example, the alternation of the eye shutters 54/56 is intended to occur during the leading edge transition and falling edge transition of the synchronization signal 90 at the television 5. It is anticipated that when non-three-dimensional content is displayed, a special transmission packet is sent to signal the eyewear 50A to open both shutters 54/56.

In one embodiment, the internal television 5 (or other base-device) has an internal synchronization signal 90 that is true (1-value, positive, etc) when left-eye content is displayed on the display 7 and is false (0-value, zero, etc) when right-eye content is displayed on the display 7. Ideally, the left-eye 54 shutter opens when the internal synchronization signal 90 is true and closes when the internal synchronization signal 90 is false and the right-eye shutter 56 is opens when the internal synchronization signal 90 is false and closes when the internal synchronization signal 90 is true. The television 5 (or other base-device) begins transmission of a synchronization packet 57 at $t_0$ and the transceiver 53 does not have a completely received and processed packet 57 until $t_0+l$. At $t_0+l$, the transceiver 53 transitions the output synchronization signal 70 from zero to one to signal the timing circuit 55. This synchronization signal 70 lags the television's 5 internal synchronization signal 90 and is not directly used to control shuttering of the left-eye shutter 54 and right-eye shutter 56 because such shuttering would result in blurred images and/or other undesirable artifacts. The eyewear synchronization signal 70 is combined with the latency value l to recreate an eyewear internal synchronization signal 96 that closely aligns with the television 5 internal synchronization signal 90. In this example, the latency value l is determined during the first synchronization packet 57 transmission at t0 and is subsequently subtracted from the eyewear synchronization signal 70 to determine the positive transition for the internal synchronization signal 98. After receiving two synchronization packets at t0 and t2, the timing circuit 55 determines the full cycle time by subtracting $t_0+l$ from $t_1+l$. The timing circuit 55 divides the full cycle time by two to determine the half-cycle time (e.g. the time each shutter 54/56 alternate). The timing circuit determines when the leading edge 97 of the internal synchronization signal 96 will occur by subtracting the latency value l from the internal synchronization signal 94 pulse at $t_2$ and adding one full cycle time. The timing circuit determines when the falling edge 98 of the internal synchronization signal 96 will occur by adding the half cycle time to the time of the leading edge 97. This sequence continues until any loss of the synchronization packets 57, at which time, it is preferred, but not required, that the timing circuit include a phase locked loop that locks onto the internal synchronization signal 96 and continues the operation of the shutters 54/56 until the synchronization packets 57 are again received.

The third waveform 94 represents the transmission of an acknowledgement packet from the eyewear 50A to the television 5. In general, most wireless protocols use acknowledgement packets to signal the transmitter of successful reception of packets such as the synchronization packet 57.

Figure 6:
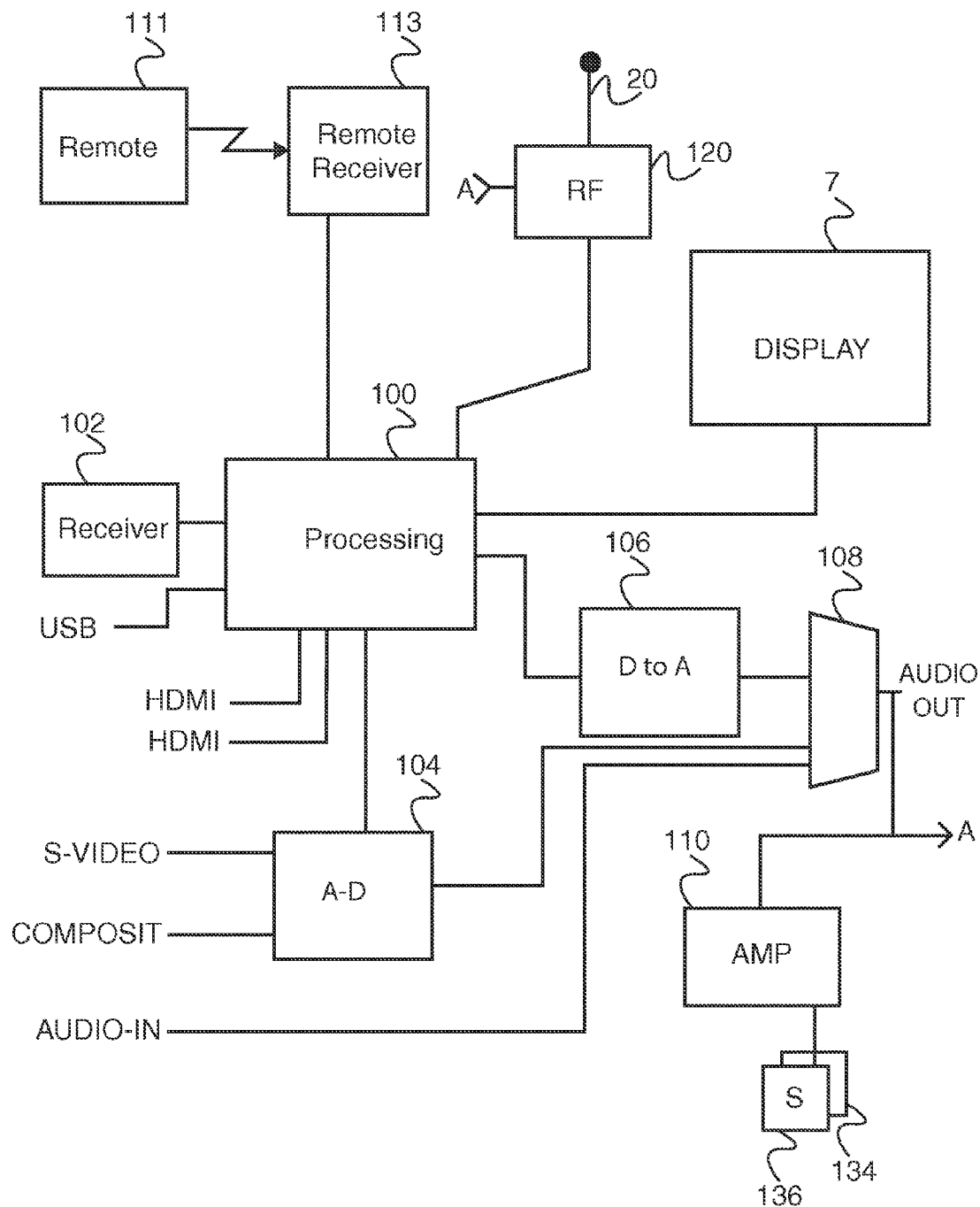
FIG. 6 illustrates a block diagram of a typical television system with wireless synchronization transmission.

Referring to FIG. 6, a first exemplary schematic view of an exemplary television will be described. This figure is intended as a representative schematic of a typical monitor/television 5 and in practice, some elements are not present in some monitors/televisions 5 and/or additional elements are present in some monitors/televisions 5 as known in the industry. In this example, a display panel 7 is connected to a processing element 100. The display panel 7 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High Definition Multimedia Interface (HDMI), USB ports and an analog-to-digital converter 104. The analog-to-digital converter 104 accepts analog inputs from legacy video sources such as S-Video and Composite video and converts the analog video signal into a digital video signal before passing it to the processing element. The processing element controls the display of the video on the display panel 7.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 134/136.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

The television internal synchronization signal 90 is generated by, for example, the processing element 100. The processing element 100 determines when a three-dimensional content is being displayed and when left-eye content or right-eye content is being displayed by receiving such indication on an input signal (e.g., HDMI, USB, etc) or extracting such information from the video display signal, for example, a specific set of pixels of each frame dedicated to indicate left-frame or right-frame. The processing element 100 communicates with an RF transceiver 120 to initiate transmission of the synchronization packet 57 at, for example, the start of the left-eye frame. In other embodiments, the processing element 100 communicates with an RF transceiver 120 to initiate transmission of the synchronization packet 57 at the start of each frame and each synchronization packet 57 includes an indication of which type of frame (left-eye or right-eye or two-dimensional) is being displayed.

In embodiments in which the television computes the latency l, the RF transceiver 120 signals the processing element 100 when an acknowledgement of the synchronization packet 57 is received back from the eyewear 50A. The processing element 100 then determines the round-trip time from the start of transmission until the receipt of the acknowledgement and allocates a portion of the round-trip time to generate a latency l value. The latency l value is then encoded into the next synchronization packet 57 for use within the receiver 80/81 to correctly synchronize to the synchronization packet 57. In some embodiments, instead of transmitting the latency value to the receiver 80/81 within the eyewear 50A, the processing element 100 uses the latency value l to transmit the synchronization packet 57 earlier than the actual synchronization point so that, under normal conditions, the reception of the synchronization packet 57 by the receiver 80/81 coincides with the synchronization point.

Equivalent elements can be substituted for the ones set forth above such that they perform in substantially the same manner in substantially the same way for achieving substantially the same result.

It is believed that the system and method and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A three-dimensional eyewear synchronization system comprising:

three-dimensional eyewear having a receiver and a shutter system, the shutter system alternating image viewing to each eye of the eyewear, the three-dimensional eyewear receiving a synchronization packet, indicative of synchronization on a remote transmitter, and also measuring a transmission time value indicating an amount of time taken for a transmission of the synchronization packet, and using the transmission time value by allocating a portion of the amount of the transmission time value to be a transmission latency and using a time of receipt of the synchronization packet and the transmission latency to generate an eyewear internal synchronization timing that approximates a synchronization timing in the transmitter;

where the three-dimensional eyewear controls the shutter system responsive to the eyewear internal synchronization timing.

2. The three-dimensional eyewear synchronization system of claim 1, further comprising the transmitter, the transmitter sends a synchronization packet indicating the synchronization timing between left-eye content and right-eye content.

3. The three-dimensional eyewear synchronization system of claim 2, further comprising a timing circuit that locks onto the internal synchronization timing and the timing circuit continues operation of the shutter system at times when the synchronization packets are not received.

4. The three-dimensional eyewear synchronization system of claim 1, wherein the eyewear determines a speed of transmission over a variable-rate link, and using the speed of transmission to determine the allocating.

5. The three-dimensional eyewear synchronization system of claim 3, wherein the timing circuit locks onto the internal synchronization timing and the timing circuit continues operation of the shutter system at times when the synchronization packets are not received.

6. The three-dimensional eyewear of claim 3, wherein the timing circuit includes a phased-locked loop.

7. The three-dimensional eyewear of claim 1, wherein the transmitter is selected from the group consisting of a WiFi transmitter, a Bluetooth transmitter and an infrared transmitter.

8. The three-dimensional eyewear of claim 2, wherein the transmitter is integrated into a television.

9. A three-dimensional eyewear synchronization system comprising:

a three-dimensional eyewear set, having a receiver, the receiver receiving information over a variable rate wireless network from a remote television, that presents left-eye frames and right-eye frames;

a the receiver receiving a synchronization packet synchronized to which of the left-eye frame and the right-eye frame is being displayed on the display at different times based on a synchronization packet associated with the television;

a controller, determining a latency of a transmitting of the synchronization packet that measuring transmission time values indicating an amount of time taken for a transmission, and using the transmission time values and also using a rate of the variable rate wireless network to allocate a portion of the amount of the time to be a transmission latency and using a time of receipt of the synchronization packet and the transmission latency to generate an eyewear internal synchronization timing that approximates a synchronization timing in the television: and the controller also synchronizing shutters of the three-dimensional eyewear, using a time of reception of the synchronization packet and the latency to approximate the timing of the display of the left-eye frames and the right-eye frames.

10. The three-dimensional eyewear synchronization system of claim 9, further comprising a locking circuit, which locks to a synchronization, thereby continuing operation of the synchronizing the shutter in absence of the synchronization packet.

11. The three-dimensional eyewear synchronization system of claim 10, wherein the locking circuit includes a phased-locked loop.

12. The three-dimensional eyewear synchronization system of claim 9, wherein receiver uses a wireless transmission selected from the group comprising WiFi and Bluetooth.

13. The three-dimensional eyewear synchronization system of claim 9, wherein the controller operates to determine a length of the synchronization packet and to determine a transmission rate.

14. The three-dimensional eyewear synchronization system of claim 9, wherein the controller determines a time of a transmission of the synchronization packet and determines a time of a reception of an acknowledgement of receipt of the synchronization packet.

15. The three-dimensional eyewear synchronization system of claim 14, wherein the latency is digitally encoded into a subsequent synchronization packet.

16. The three-dimensional eyewear synchronization system of claim 9, wherein the controller also adjusts a skew of the synchronizing of the shutters.

17. A three-dimensional eyewear synchronization system comprising:

a television, the television having a display, the display presenting left-eye frames and right-eye frames;

the television creating a synchronization signal representing a change between displaying of the left-eye frame and displaying of the right-eye frame on the display;

the television operating for measuring a latency value by sending a transmission, receiving a response to the transmission, determining a round-trip time between the start of the transmission until the receipt of the acknowledgment, and allocating a portion of the round-trip time to create a latency value between the sending of the transmission and an estimated receipt of the transmission which corresponds only to a portion of the round-trip time;

a transmitter which sends a synchronization packet synchronized to the synchronization signal at a time which is advanced in time based on the latency value by an amount such that the three-dimensional eyewear will receive the transmission packet at a time that is estimated to be synchronized with the synchronization signal in the television.

18. The three-dimensional eyewear synchronization system of claim 17, wherein the transmitter uses a wireless transmission selected from the group comprising WiFi and Bluetooth.

19. The three-dimensional eyewear synchronization system of claim 17, wherein the television determines the latency by determining a length of the synchronization packet and a by determining a transmission rate of the transmitter.

20. The three-dimensional eyewear synchronization system of claim 17, wherein the television determines the time of a transmission of the synchronization packet and determines a time of a reception of an acknowledgement of receipt of the synchronization packet.

* * * * *